United States Patent

Patel et al.

[11] Patent Number: 5,923,695
[45] Date of Patent: Jul. 13, 1999

[54] COMPACT PUMPED LASER RESONATOR AND METHOD

[75] Inventors: Ashok B. Patel, Cerritos; Mario P. Palombo, Manhattan Beach, both of Calif.

[73] Assignee: Raytheon Company, Lexington, Mass.

[21] Appl. No.: 08/872,908

[22] Filed: Jun. 11, 1997

[51] Int. Cl.$^6$ .................................................. H01S 3/0941
[52] U.S. Cl. ............................. 372/75; 372/36; 372/93; 372/100
[58] Field of Search ................................. 372/75, 72, 70, 372/69, 109, 36, 93, 100

[56] References Cited

U.S. PATENT DOCUMENTS

| | | |
|---|---|---|
| 4,170,763 | 10/1979 | Radecki et al. . |
| 4,420,836 | 12/1983 | Harper . |
| 5,388,119 | 2/1995 | Cronin et al. ............................. 372/69 |
| 5,455,838 | 10/1995 | Hertier et al. . |
| 5,506,854 | 4/1996 | Basu . |
| 5,561,684 | 10/1996 | Martin . |

FOREIGN PATENT DOCUMENTS

| | | |
|---|---|---|
| 0 610 935 A1 | 10/1994 | European Pat. Off. . |
| 40 41 130 A1 | 2/1992 | Germany . |
| 4-219988 | 8/1992 | Japan ....................................... 372/94 |
| 2 087 136 | 5/1982 | United Kingdom . |

Primary Examiner—James W. Davie
Attorney, Agent, or Firm—Colin M. Raufer; Leonard A. Alkov; Glenn H. Lenzen, Jr.

[57] ABSTRACT

A system and a method of designing and mechanical packaging of pumped laser resonator elements to minimize their size. All the elements of the compact pumped laser resonator assembly are placed on a monolithic block mount, which substitutes and functions as a laser diode heatsink, a laser resonator cavity mount, and an optical bench. The laser optical cavity has a plurality of bends, in order to decrease the size of the assembly, and the laser resonator optical elements include fold prisms, a reflector, a retroreflector and an intracavity optical Q-switch. A miniaturized diode array pumped laser resonator assembly using a miniature monolithic block mount may have a volume of less than one cubic inch and dimensions less than or equal to about 30 mm×25 mm×13 mm in metric units, and may weigh less than two ounces or 56 g, while providing a laser power of more than 1 mJ, thereby creating a very small but highly powerful pumped laser resonator assembly. The compact pumped laser resonator is preferably manufactured by machining the monolithic block mount using a computer-controlled machine, to generate a plurality of component mounts with a substantially identical setup and tolerances, in order to keep the laser resonator self-aligned.

15 Claims, 4 Drawing Sheets

COMPACT PUMPED LASER RESONATOR AND METHOD

FIELD OF THE INVENTION

The present invention relates generally to the field of pumped laser resonator assemblies and more particularly to their mechanical packaging.

BRIEF DESCRIPTION OF THE PRIOR ART

A laser pumphead assembly conventionally consists of a laser resonator cavity, mounted on one heatsink, and a pumping energy source mounted on another, relatively large, heatsink. Optical elements are mounted on additional optical mounts and are combined with the laser pumphead assembly to create a pumped laser resonator assembly. Therefore, conventional diode array pumped laser resonator assemblies are made of several separate subsystems, each mounted on its own mount, which creates many thermal barriers and requires additional cooling systems, thus making presently known systems large, heavy, complex, inflexible and expensive.

SUMMARY OF THE INVENTION

The present invention relates to a method of designing and mechanical packaging of the laser resonator elements, and to a compact pumped laser resonator assembly, having multiple elements integrated on a monolithic block mount, which preferably functions as a laser diode heatsink, laser resonator cavity mount, and an optical bench.

An overall object of the present invention is to simplify the design of a pumped laser resonator assembly while at the same time providing good heat dissipation, laser output efficiency, and laser diode array life.

In accordance with one specific aspect, the present invention facilitates a miniaturized pumped laser resonator assembly utilizing only one mounting block for all its elements, which is easy to assemble, very convenient to operate, and adaptable to different needs and uses, without requiring extraneous mount blocks, cooling systems, mounting brackets and the like, as are used in conventional systems.

Another aspect of the present invention relates to a method of designing and mechanical packaging of pumped laser resonator elements to minimize their size to thereby provide a relatively compact pumped laser resonator assembly which may be manufactured by machining a monolithic block mount using a computer-controlled machine to generate a plurality of component mounts with a substantially identical setup and tolerances, in order to keep the laser resonator self-aligned.

Yet another aspect of the present invention is to provide a pumped laser resonator assembly in which all the elements are placed on the top of a monolithic block mount, which substitutes for and functions as a laser diode heatsink, a laser resonator cavity mount, and an optical bench. The laser optical cavity preferably is provided with a plurality of bends, in order to decrease the size of the assembly, and the laser resonator optical elements preferably includes fold prisms or corner cubes, a reflector, a retroreflector and an intracavity optical Q-switch.

Still another aspect of the present invention is a miniaturized diode array pumped laser resonator assembly, using a miniature monolithic block mount and having a volume of less than about one cubic inch (about 15 cm$^3$) and dimensions preferably not more than about 30 mm×25 mm×13 mm in metric units, and weighing less than two ounces (about 55 g), while providing a laser power of more than 1 mJ, thereby creating a miniaturized, highly efficient diode array pumped laser resonator assembly that can provide very high laser energy output in a very small physical volume.

The foregoing and additional features and advantages of this invention will become further apparent from the detailed description and accompanying drawing figures that follow. In the figures and written description, numerals indicate the various features of the invention, like numerals referring to like features, throughout for the drawing figures and the written description.

DETAILED DESCRIPTION OF THE INVENTION

The present invention relates to the design and mechanical packaging of a laser medium, laser pumping energy source, laser resonator optical elements and their mounts to provide a compact, often miniature, system suitable for many commercial and military laser applications. Laser resonator components are well known in the art and do not need to be described here or be shown in detail.

Figure 1:
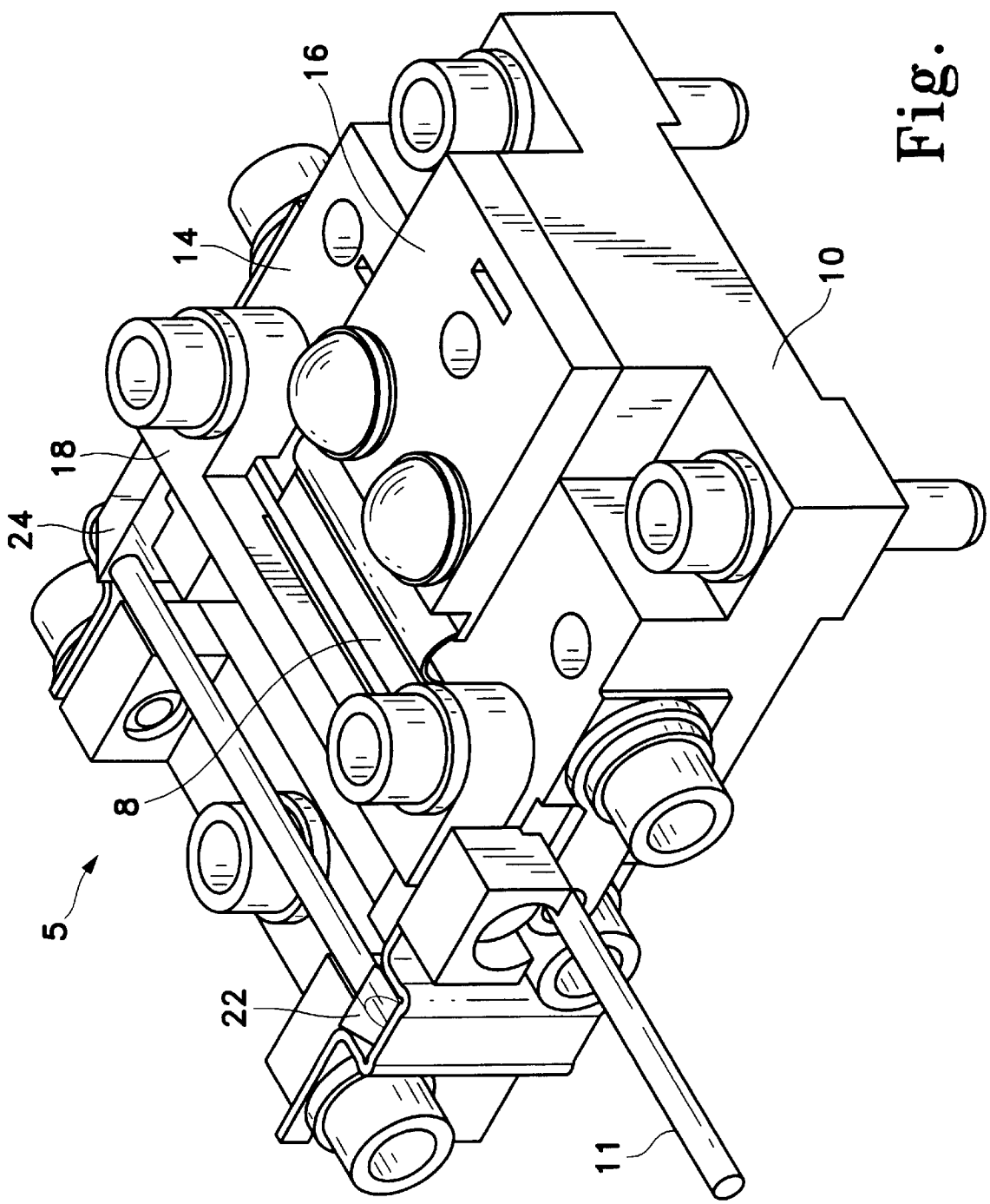
FIG. 1 is a perspective view showing a diode array pumped laser resonator assembly, in accordance with one embodiment of the present invention.

FIG. 1 is a perspective view showing a pumped laser resonator assembly 5, in accordance with one aspect of the present invention. The pumped laser resonator assembly 5 can be pumped by a laser diode array 8 and is created using another aspect of the present invention, which is a method of designing and mechanical packaging of the pumped laser resonator assembly 5. In accordance with the method aspects of the present invention, a laser pumphead 6, a source of pumping energy such as laser diode array 8, and the laser resonator optical elements are combined on a same monolithic block 10 mount to create a pumped laser resonator assembly 5. Instead of using the laser diode array 8, a laser rod 12 could be pumped with a flashlamp or another energy source.

In accordance with another aspect of the present invention, the physical dimensions of the pumped laser resonator components, including a laser optical cavity (represented as a laser path 11), and the monolithic block mount 10 are miniaturized, separate mounts. For this aspect of the present invention relating to the miniature pumped laser resonator assemblies, the laser pumping energy source should be the laser diode array 8, due to its small size.

As is illustrated in FIG. 1, the monolithic block mount 10 is a simple mount which combines all functions of otherwise separate elements, such as heatsink, optical mounts and laser resonator cavity mount, in one pumped laser resonator monolithic block, Monolithic block mount 10. can be made of any metallic material, such as copper, aluminum, magnesium or titanium, which permits good heat dissipation.

The laser diode array 8 is directly mounted on a smooth top surface of the pumped laser resonator monolithic block mount 10 to permit heat flow from laser diode junction to the base of the pumped laser resonator monolithic block mount 10. This arrangement lowers the laser diode junction temperature, thus increasing the laser diode operating life very significantly.

The present invention allows placement of more than one laser diode array 8 on the pumped laser resonator monolithic block mount 10, in various configuration modes, to provide higher laser energy. For example, the laser diode array 8 bars can, possibly, be stacked on top of each other, and their energy can be focused on the laser rod 12 by using a focusing lens, not shown. The laser diode array 8 bars can also be staggered in one line, but then the laser bar 12 has to be made longer, which will increase the size of the pumped laser resonator assembly 5.

FIG. 1 also illustrates one way of providing the required voltage to the laser diode array 8, using a diode anode 14 and a diode cathode 16, placed directly on the monolithic block mount 10 and adjacent to the laser diode array 8. The laser rod 12 is placed adjacent to the laser diode array 8, close to the middle to the top surface of the monolithic block mount 10, and is held in its place on by a laser rod clamp 18. In addition, two optical elements are shown in FIG. 1, a first fold prism 22 and a second fold prism 24, to thereby provide a folded laser optical path 11. Prisms 22, 24 are placed on the side of the monolithic block mount 10 opposite from the laser diode array 8 side, at the opposite ends of the laser optical path 11. Instead of the first and second fold prisms 22, 24, several mirrors can be used, but with additional alignment problems and increased cost. As shown, the first fold prism 22 is in the form of a corner cube element, and the second fold prism 24 is in the form of a double fold prism. The second fold prism 24 can be eliminated, in which case the shape of the assembly 5 becomes narrower and longer with only two bends 40.

Figure 2:
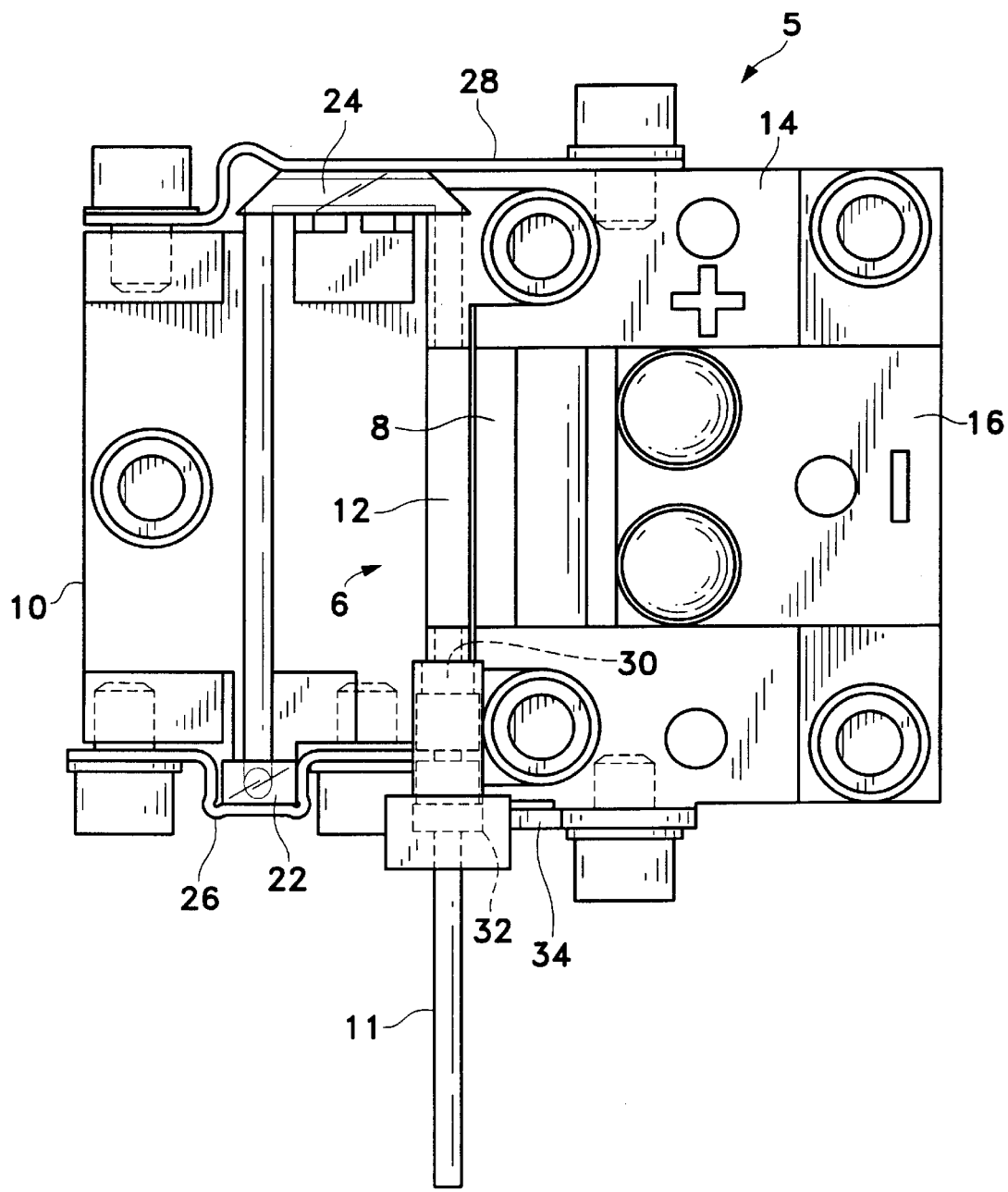
FIG. 2 is a top view of the diode array pumped laser resonator assembly presented in FIG. 1.

FIG. 2 is a top view of the diode array pumped laser resonator assembly 5 presented in FIG. 1, showing a first fold prism mount 26 and a second fold prism mount 28, for the attachment of the first and second fold prisms 22, 24. In addition, FIG. 2 illustrates the positions of a Q-switch 30, a retroreflector 32 and a retroreflector mount 34. All three optical element mounts, the first fold prism mount 26, the second fold prism mount 28 and the retroreflector mount 34, are attached to the monolithic block mount 10 and are made of spring material, such as steel, beryllium, copper, phosphorus or bronze, to hold the optical elements, including the first and second fold prisms 22, 24, the Q-switch 30, and the retroreflector 32, clamped at the same location and prevent their movement, in order to keep the laser rod 12 self-aligned. Moreover, the mounts 26, 28 and 34 are preferably made using paralleled machining technique to facilitate the laser rod 12 alignment. The Q-switch 30 and a reflector 38 are attached at an input end of the laser optical path 11 and the retroreflector 32 is attached at an output end of the laser optical path 11.

Figure 3:
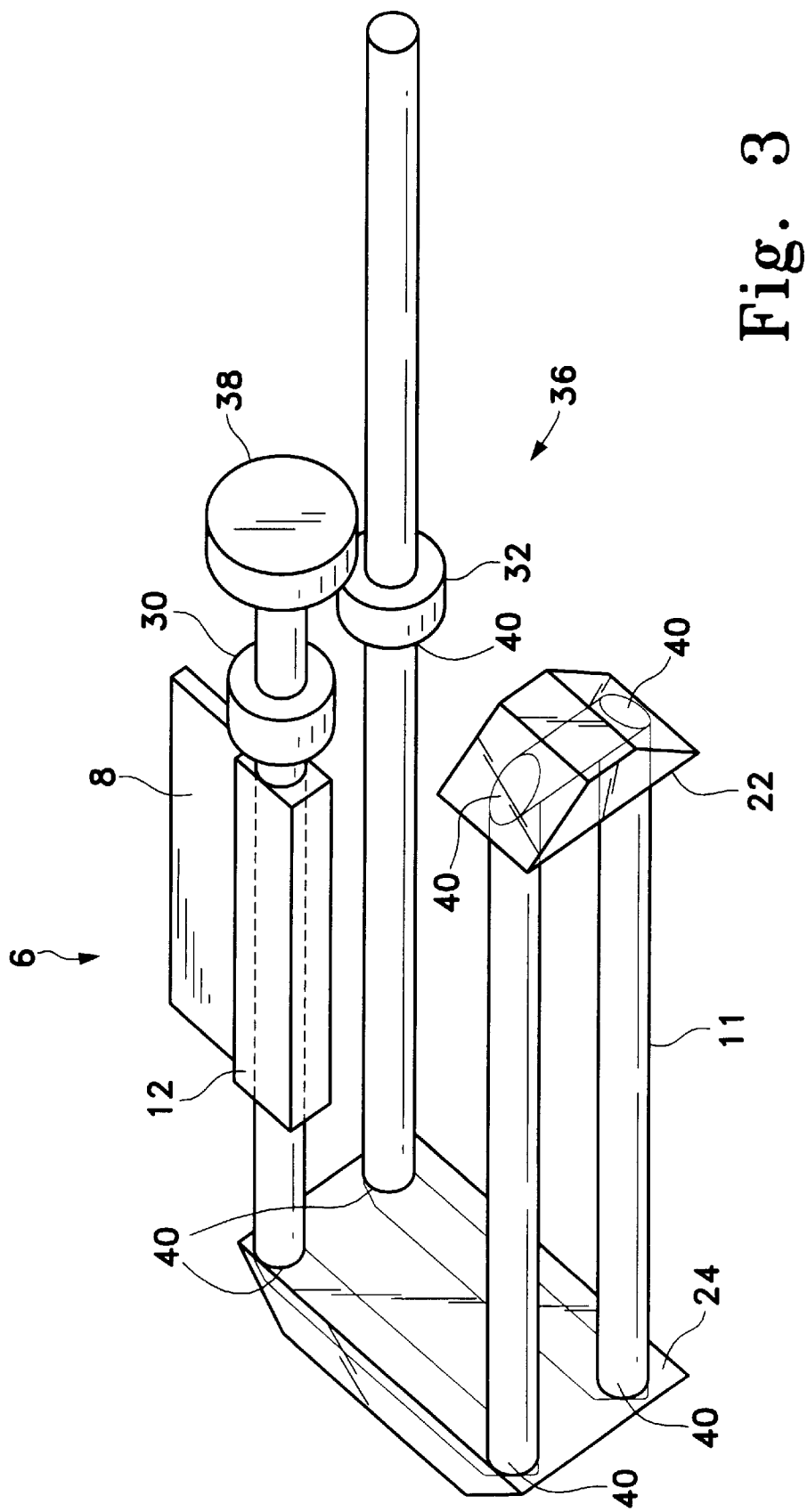
FIG. 3 is a perspective view of a laser rod, laser diode array, and optical elements used in the assembly presented in FIG. 1.

FIG. 3 is a perspective view of a pumped laser optical assembly 36, showing the laser rod 12, the laser diode array 8, and the arrangement of the optical elements of the present invention, including the first and second fold prisms 22, 24, the Q-switch 30, and the retroreflector 32, used to form the pumped laser resonator assembly 5 presented in FIGS. 1 and 2. In addition, FIG. 3 shows the reflector 38 and the unique shape of the laser optical path 11, which in one aspect of the present invention has two parallel levels, is bent six times and has seven optical bends 40, in order to minimize the physical length of the pumped laser resonator assembly 5 and still provide required optical length of the laser optical path 11. In addition, it is conceivable that additional optical elements can be mounted on the same monolithic block mount 10, like a plano-convex lens, not shown, which can be added after the retroreflector 32 in order to produce a collimated laser beam, if required.

Figure 4:
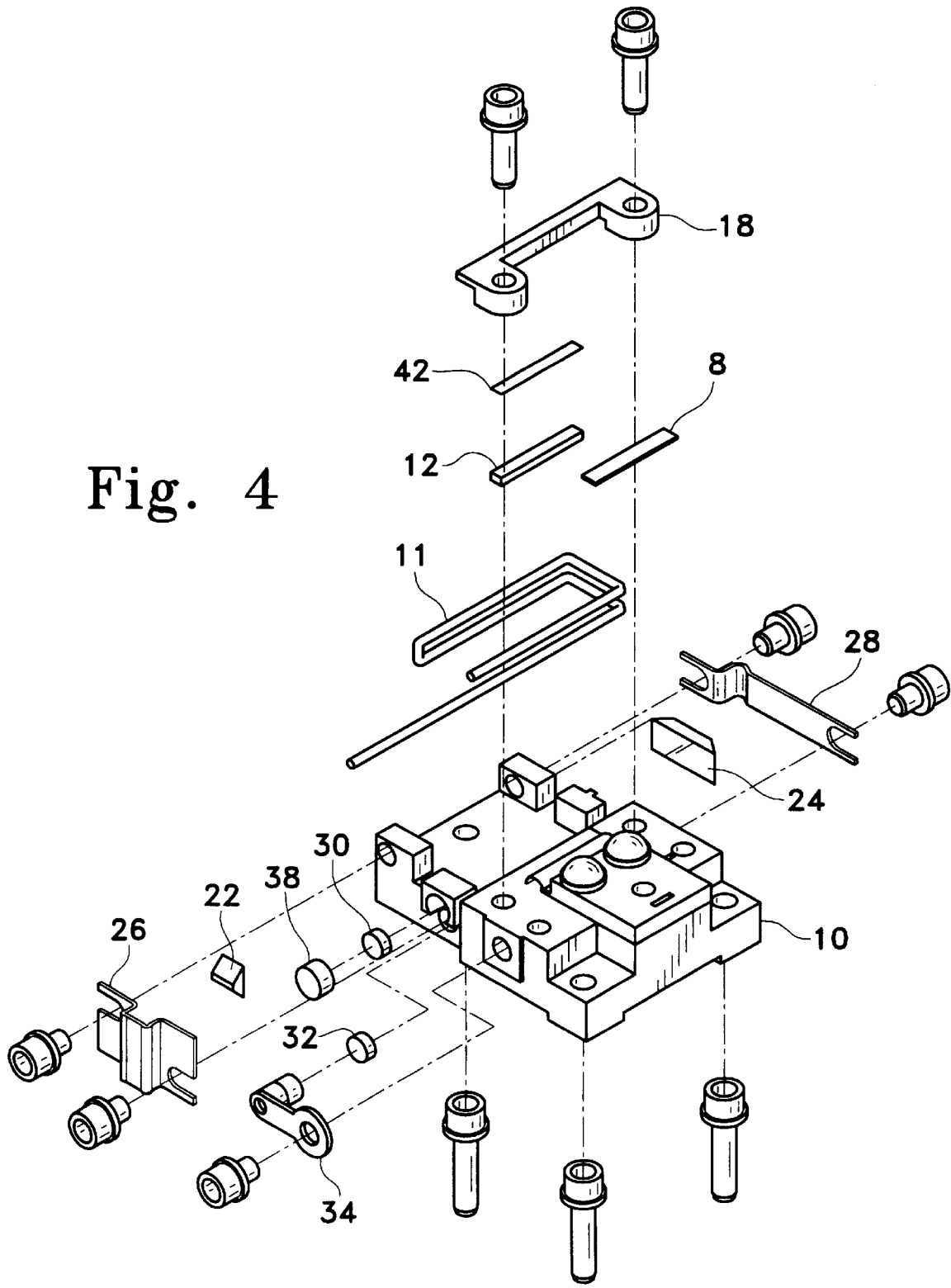
FIG. 4 is an exploded perspective view of the diode array pumped laser resonator assembly presented in FIG. 1, showing the relative placement of all optical elements mounted on the pumped laser resonator assembly monolithic block mount.

FIG. 4 is an exploded perspective view of the diode array pumped laser resonator assembly 5 presented in FIGS. 1 and 2, showing the relative placement of all its optical elements mounted on the pumped laser resonator assembly monolithic block mount 10. In the present invention, the laser rod 12 has two smooth flat parallel surfaces and two concave surfaces, along the laser optical path 11, and is attached close to the input end of the laser optical path 11, which ends with the Q-switch 30 and a reflector 38. The concave surfaces of the laser rod 12 are coated with the appropriate material to allow for internal reflection and transmission of laser energy. However, another type of laser rod without the concave surfaces could be used instead, which would require placement of two additional concave reflectors, for example, a concave reflector and a retroreflector, placed outside the laser rod 12.

The flat surfaces of the laser rod 12 of the present invention are sandwiched between the smooth flat top surface of the pumped laser resonator monolithic block mount 10 and the bottom surface of the laser rod clamp 18 covered with a thin indium foil 42. This design allows direct heat transfer from the laser rod 12 to the pumped laser resonator monolithic block mount 10 and the laser rod clamp 18. In addition, the monolithic block mount 10 keeps the laser rod 12 self-aligned.

The thin indium foil 42 is about 0.005 inches thick, soft and changes its thickness when compressed between the laser rod 12 and the laser rod clamp 18, which helps in keeping the laser rod 12 and the laser diode array 8 in self-aligned position and within required tolerances. The thin indium foil 42 also reduces thermal resistance between the laser rod 12 and the laser rod clamp 18 and, therefore, the heat transfer of the laser rod 12 is very efficient. An additional thin indium foil could be placed on the other side of the laser rod 12 in order to protect the laser rod 12 from overheating and abrasion. Moreover, the laser rod clamp 18 could be replaced with a spring load, not shown.

In the present invention, the laser diode array 8 is cooled passively and very efficiently by the monolithic block mount 10 itself, used instead of a heatsink, which means that no additional cooling systems are needed. The method of mounting the laser diode array 8 directly onto the monolithic block mount 10 acting as a heatsink greatly reduces the thermal resistance of the pumped laser resonator assembly 5, thus improving cooling of the laser diode array 8 and increasing the laser diode array 8 efficiency and life. In the present invention, heat dissipated by laser diode array 8 is transferred through a very short heat path through the monolithic block mount 10, acting as a heatsink, to an outside mounting surface of the monolithic block mount 10.

Because passive cooling is utilized, the pumped laser resonator assembly 5 has a uniform pumping profile with a very short thermal resistance path, and maintains minimum diode junction temperature. In addition, the monolithic block mount 10 provides direct mount of the laser rod 12 to a smooth co-planar surface of the monolithic block mount 10, thus keeping the temperature of the laser rod 12 low and uniform. Further, the monolithic block mount 10 provides self-alignment of the laser rod 12, due to the fact that the whole monolithic block mount 10 can be machined using the same setup and using a computer-controlled numerical control machining process, which is a preferred method of the present invention. Therefore, all required tolerances of parallelism, perpendicularity and surface profiles, needed to keep the laser rod 12, Q-switch 30, reflector 38, retroreflector 32, and fold prisms 22, 24 in place, are made to be the same, and the laser rod 12 is self-aligned without any additional extraneous systems.

The diode array pumped laser resonator 5 preferably has a weight of less than 2 ounces (or 56 g), a volume smaller than 1 cubic inch (15 cm3), and dimensions not more than about 30 mm×25 mm×13 mm, and provides with more than 1 mJ of laser output. Combining all the separate mounts into one, miniature block mount 10, reduces the number of laser parts, thus creating a light weight, small volume diode array pumped laser resonator assembly 5, most desirable in hand-held systems.

The miniaturized a diode array pumped laser resonator assembly 5 can be applied to various laser systems, in commercial and military applications. Potential commercial applications include automobiles range finders, detection and collision avoidance systems, and rifle aiming devices and the like, used for detecting target range for police work and for some sports, like hunting.

While this invention has been described with reference to its presently preferred embodiment(s), its scope is only limited insofar as defined by the following set of claims and all equivalents thereof.

What is claimed is:

1. A compact pumped laser resonator assembly, comprising:
   a mount;
   a laser pumphead secured to the mount, the laser pumphead comprising a laser rod and a laser diode array and the optical elements define a laser path; and
   a plurality of laser resonator optical elements secured to the mount, said plurality of laser resonator optical elements comprising a fold prism, a reflector, a retroreflector and an intracavity optical Q-switch, the laser path having a plurality of bends, and at least some of said bends being defined by the fold prism;
   wherein
      the mount is a monolithic block defining a laser resonator
      the monolithic block mount functions as a heatsink for facilitating heat dissipation and power efficiency in a relatively compact assembly and
      the monolithic block mount functions as an optical bench for keeping the optical elements and the laser pumphead self-aligned.

2. The assembly as claimed in claim 1 wherein
   said compact pumped laser resonator assembly is a miniaturized diode array pumped laser resonator assembly, and
   said mount is a miniaturized monolithic block.

3. The assembly as claimed in claim 2 wherein said miniaturized diode array pumped laser resonator assembly including said miniaturized monolithic block mount:
   have a combined external dimension of not more than about 30 mm×25 mm×13 mm,
   have a combined weight of less than 56 g, and
   provide a laser power of more than 1 mJ.

4. The assembly as claimed in claim 1 wherein
   the plurality of laser resonator optical elements comprises a first fold prism, a second fold prism, a reflector, a retroreflector, an intracavity optical Q-switch,
   the laser path has a plurality of bends,
   some of said bends are located in the first fold prism and
   some of said bends are located in the second fold prism.

5. A method of packaging a pumped laser resonator assembly, comprising the following steps:
   forming a monolithic block mount;
   mounting a plurality of laser elements on the monolithic block mount along a predetermined laser path, the plurality of laser elements comprising a laser rod, a laser diode array, and a plurality of laser resonator optical elements, the plurality of laser resonator optical elements comprising a fold prism, a reflector, a retroreflector and an intracavity optical Q-switch, the laser rod and the laser resonator optical elements being arranged along a laser path having a plurality of bends, and at least some of said bends being located in the fold prism;
   wherein
      the monolithic block mount functions as a heatsink for facilitating heat dissipation and
      the monolithic block mount functions as an optical bench for keeping the laser elements self-aligned.

6. The method as claimed in claim 5 wherein
   said compact pumped laser resonator assembly is a miniaturized diode array pumped laser resonator assembly, and
   said monolithic block mount is a miniaturized monolithic block mount.

7. The method as claimed in claim 6, wherein said miniaturized diode array pumped laser resonator assembly including said miniaturized monolithic block mount:
   have a combined external dimension of not more than about 30 mm×25 mm×13 mm,
   have a combined weight of less than 56 g, and
   provide a laser power of more than 1 mJ.

8. The method as claimed in claim 7, wherein
   the forming step comprises machining the monolithic block mount using a computer-controlled machine to generate a plurality of component mounts each having a substantially identical setup and tolerances,
   each said component mount is adapted to fixedly secure a different one of said laser resonator optical elements and
   the mounting step comprises fixedly mounting each said laser resonator element onto a respective said component mount.

9. The method as claimed in claim 8 wherein
   the component mounts comprises a laser rod clamp, a laser diode array mount, a laser resonator cavity mount and an optical mount, and
   the laser rod is sandwiched between the laser rod clamp and the monolithic block mount.

10. The method as claimed in claim 9 wherein the laser rod is protected with a thin indium foil from abrasion and excessive heat.

11. The method as claimed in claim 5,
   the forming step comprises machining the monolithic block mount using a computer-controlled machine to generate a plurality of component mounts each having a substantially identical setup and tolerances,
   each said component mount is adapted to fixedly secure a different one of said laser resonator elements and
   the mounting step comprises fixedly mounting each said laser resonator element onto a respective said component mount.

12. The method as claimed in claim 5 wherein the plurality of laser resonator optical elements comprises a first fold prism, a second fold prism, a reflector, a retroreflector and an intracavity optical Q-switch, the laser rod and the laser resonator optical elements are arranged along a laser path having a plurality of bends, and some of said bends are located in the first fold prism and some of said bends are located in the second fold prism.

13. A compact pumped laser resonator assembly, comprising:

a mount;

a laser pumphead secured to the mount; and a plurality of laser resonator optical elements secured to the mount, the plurality of laser resonator optical elements comprising a first fold prism, a second fold prism, a reflector, a retroreflector, an intracavity optical Q-switch, the laser path has a plurality of bends, some of said bends being located in the first fold prism and some of said bends are located in the second fold prism;

wherein the mount is a monolithic block defining a laser resonator the monolithic block mount functions as a heatsink for facilitating heat dissipation and power efficiency in a relatively compact assembly and the monolithic block mount functions as an optical bench for keeping the optical elements and the laser pumphead self-aligned.

14. A method of packaging a pumped laser resonator assembly, comprising the following steps:

forming a monolithic block mount, the forming step comprising machining the monolithic block mount using a computer-controlled machine to generate a plurality of component mounts each having a substantially identical setup and tolerances, wherein each said component mount is adapted to fixedly secure a different one of said laser resonator elements and the mounting step comprises fixedly mounting each said laser resonator element onto a respective said component mount; mounting a plurality of laser elements on the monolithic block mount along a predetermined laser path;

wherein the monolithic block mount functions as a heatsink for facilitating heat dissipation and the monolithic block mount functions as an optical bench for keeping the laser elements self-aligned.

15. A method of packaging a pumped laser resonator assembly, comprising the following steps:

forming a monolithic block mount;

mounting a plurality of laser elements on the monolithic block mount along a predetermined laser path, the plurality of laser elements including a plurality of laser resonator optical elements secured to the mount, the plurality of laser resonator optical elements comprising a first fold prism, a second fold prism, a reflector, a retroreflector, an intracavity optical Q-switch, the laser rod and the laser resonator optical elements being arranged along a laser path having a plurality of bends, and some of said bends being located in the first fold prism and some of said bends are located in the second fold prism;

wherein the monolithic block mount functions as a heatsink for facilitating heat dissipation and the monolithic block mount functions as an optical bench for keeping the laser elements self-aligned.

* * * * *